(12) United States Patent
Verma et al.

(10) Patent No.: US 11,425,462 B1
(45) Date of Patent: Aug. 23, 2022

(54) SYSTEMS AND METHODS FOR VARIABLE IN-VEHICLE ADVERTISEMENT SKIP WINDOW DURATION

(71) Applicant: Ford Global Technologies, LLC, Dearborn, MI (US)

(72) Inventors: Himanshu Verma, Farmington Hills, MI (US); Fling Finn Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/402,203

(22) Filed: Aug. 13, 2021

(51) Int. Cl.
*H04N 21/45* (2011.01)
*H04N 21/458* (2011.01)
*H04N 21/414* (2011.01)
*H04N 21/472* (2011.01)
(Continued)

(52) U.S. Cl.
CPC ..... *H04N 21/458* (2013.01); *H04N 21/41422* (2013.01); *H04N 21/44222* (2013.01); *H04N 21/4532* (2013.01); *H04N 21/47217* (2013.01); *H04N 21/812* (2013.01)

(58) Field of Classification Search
CPC ........... H04N 21/458; H04N 21/41422; H04N 21/44222; H04N 21/4532; H04N 21/47217; H04N 21/812
See application file for complete search history.

(56) References Cited

U.S. PATENT DOCUMENTS

| 5,609,217 A * | 3/1997 | Honda ................. B60K 31/047 180/170 |
| 7,720,351 B2 * | 5/2010 | Levitan .............. H04N 21/8355 386/250 |

(Continued)

OTHER PUBLICATIONS

C. Borgiattino et al. "Advertisement Delivery and Display in Vehicular Networks" (Jan. 2016).

(Continued)

*Primary Examiner* — Jefferey F Harold
*Assistant Examiner* — Timothy R Newlin
(74) *Attorney, Agent, or Firm* — Brandon Hicks; Eversheds Sutherland (US) LLP (57) ABSTRACT

Systems and methods for an in-vehicle entertainment system located in a vehicle include determining that the in-vehicle entertainment system is in operation, determining vehicle information available to the in-vehicle entertainment system, determining user data available to the in-vehicle entertainment system, determining a level of user interaction based on the vehicle information and the user data, and adjusting a minimum advertisement play window prior to permitting a skip to user-chosen content as a function of the level of user interaction. Vehicle information includes traffic, speed, and location. User data includes data related to whether a passenger is present, historical user data, the historical user data identifying past interactions, and user preferences associated with the in-vehicle entertainment system. Adjusting a minimum advertisement play window includes reducing the minimum advertisement play window if the level of user interaction is high and increasing the minimum advertisement play window if the level of user interaction is low.

9 Claims, 5 Drawing Sheets

(51) Int. Cl.
*H04N 21/81* (2011.01)
*H04N 21/442* (2011.01)

(56) References Cited

U.S. PATENT DOCUMENTS

| | | | | |
|---|---|---|---|---|
| 8,849,509 | B2* | 9/2014 | Liu | G06F 7/00 |
| | | | | 701/36 |
| 9,386,328 | B1* | 7/2016 | Crane | H04N 21/2387 |
| 9,448,619 | B1* | 9/2016 | Kerns | G06F 3/00 |
| 9,830,618 | B2* | 11/2017 | Kim | G06F 16/7867 |
| 2009/0094635 | A1* | 4/2009 | Aslin | H04N 21/44224 |
| | | | | 725/76 |
| 2011/0145856 | A1* | 6/2011 | Agarwal | H04N 21/00 |
| | | | | 725/32 |
| 2014/0201770 | A1* | 7/2014 | Schraga | H04N 21/44213 |
| | | | | 725/32 |
| 2014/0279021 | A1* | 9/2014 | MacNeille | G06Q 30/0266 |
| | | | | 705/14.63 |
| 2014/0309871 | A1* | 10/2014 | Ricci | G06Q 50/30 |
| | | | | 701/36 |
| 2014/0317653 | A1* | 10/2014 | Mlodzinski | H04N 21/812 |
| | | | | 725/32 |
| 2017/0188116 | A1* | 6/2017 | Major | H04N 21/4147 |
| 2017/0195745 | A1* | 7/2017 | Kumar BVN | H04N 21/2387 |
| 2017/0214952 | A1* | 7/2017 | Karanth | H04N 21/44204 |
| 2018/0054570 | A1* | 2/2018 | Bai | B60K 35/00 |
| 2018/0222391 | A1* | 8/2018 | Chen | H04N 5/772 |
| 2018/0343484 | A1* | 11/2018 | Loheide | H04N 21/23418 |
| 2019/0143995 | A1* | 5/2019 | Aizawa | H04N 21/42201 |
| | | | | 340/576 |
| 2019/0222885 | A1* | 7/2019 | Cho | G06Q 30/0265 |
| 2020/0326773 | A1* | 10/2020 | Bigioi | G06V 40/18 |
| 2021/0114616 | A1* | 4/2021 | Altman | H04W 36/00837 |
| 2021/0235141 | A1* | 7/2021 | Murphy | H04W 4/029 |

OTHER PUBLICATIONS

Gil Einziger et al. "Scheduling Advertisement Delivery in Vehicular Networks" (Apr. 2018).

* cited by examiner

SYSTEMS AND METHODS FOR VARIABLE IN-VEHICLE ADVERTISEMENT SKIP WINDOW DURATION

FIELD OF THE DISCLOSURE

This disclosure generally relates to advertisements in vehicles, and more particularly relates to systems and methods for variable in-vehicle advertisement skip window duration.

BACKGROUND

Advancements in motor vehicles and in-vehicle entertainment systems allow visual and audio entertainment to connect to wireless networks. As a result, cellular devices and other wireless devices communicate with in-vehicle systems allowing user interaction. With such increased interaction, there is a need to control aspects of advertisements associated with in-vehicle entertainment systems to enhance user experience and accommodate advertisers.

It is desirable to provide solutions that address different aspects of in-vehicle advertising.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, this disclosure is generally directed to systems and methods for a variable in-vehicle advertisement skip window duration. An example method for an in-vehicle entertainment system located in a vehicle includes determining that the in-vehicle entertainment system is in operation, determining vehicle information available to the in-vehicle entertainment system, determining user data available to the in-vehicle entertainment system, determining a level of user interaction based on the vehicle information and the user data, and adjusting a minimum advertisement play window prior to permitting a skip to user-chosen content as a function of the level of user interaction.

Vehicle information includes, among other things, traffic, speed, and location. User data includes data related to whether a passenger is present, historical user data, the historical user data identifying past interactions, and user preferences associated with the in-vehicle entertainment system. Adjusting a minimum advertisement play window prior to permitting a skip to user-chosen content as a function of the level of user interaction includes reducing the minimum advertisement play window prior to permitting the skip to user-chosen content if the level of user interaction is high and increasing the minimum advertisement play window prior to permitting the skip to user-chosen content if the level of user interaction is low.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a nomadic device such as a smartphone, refers to code (software code, typically) that is installed in the nomadic device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle"

as used in this disclosure generally refer to a vehicle that can perform at least some operations without a driver being seated in the vehicle.

The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation.

Figure 1:
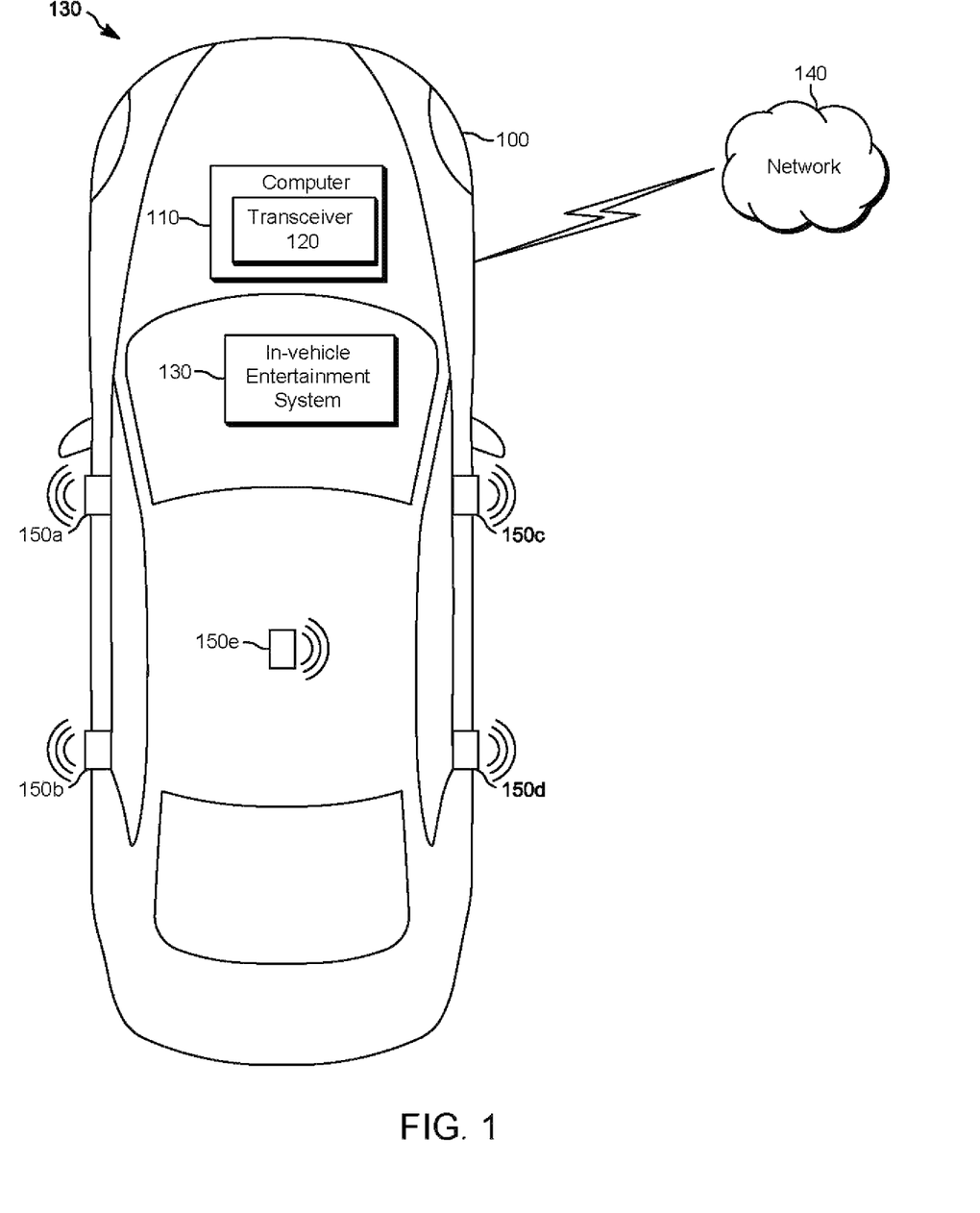
FIG. 1 illustrates an example vehicle with an in-vehicle entertainment system in accordance with one or more embodiments of the disclosure.

FIG. 1 illustrates an example vehicle 100 that includes an in-vehicle entertainment system in accordance with an embodiment of the disclosure. The vehicle 100 may be one of various types of vehicles such as a gasoline powered vehicle, an electric vehicle, a hybrid electric vehicle, or an autonomous vehicle, that is configured as a Level 2 or higher automated or semi-automated vehicle. The system 100 may be implemented in a variety of ways connect with various type of wireless devices. For example, the example system 100 can include some components that are a part of the vehicle 100, some components that may be carried out by a user of a wireless device 120, and, in some embodiments, other components that are accessible via a communications network 140. The components that can be a part of the vehicle 100 can include a vehicle computer 110 that interacts with the in-vehicle entertainment system 130 and includes transceiver 120 in communication with network 140. Transceiver 120 may further interact with other devices inside or outside vehicle 100 such as a smartphone, a display key fob, a tablet computer, such as iPad, or a headset capable of augmented reality display or the like. In one or more embodiments, transceiver 120 may be coupled to in-vehicle entertainment system to enable media controls via network 140 or other devices as one of ordinary skill in the art would appreciate.

The vehicle computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.).

The vehicle computer 110, in one or more embodiments, may execute certain operations associated with remotely controlled vehicle maneuvering and/or remote vehicle monitoring.

The transceiver 120, in one or more embodiments, interacts with the in-vehicle entertainment system 130 and may interact with a set of wireless communication nodes 150a, 150b, 150c, 150d and 150e mounted upon vehicle 130 in a manner that allows the vehicle computer 110 to provide vehicle information and user data to in-vehicle entertainment system 130. Transceiver 120 and computer 110 may further use one or more of various wireless technologies such as Bluetooth®, Ultra-Wideband (UWB), Wi-Fi, ZigBee®, Li-Fi (light-based communication), audible communication, ultrasonic communication, or near-field-communications (NFC), for carrying out communications.

The vehicle computer 110, transceiver 120 and in-vehicle entertainment system 130 may further connect to communications network 140. The communications network 140 may include any type of network, or a combination of networks, such as a local area network (LAN), a wide area network (WAN), a telephone network, a cellular network, a cable network, a wireless network, and/or private/public networks such as the Internet. For example, network 140 may support communication technologies such as TCP/IP, Bluetooth®, cellular, near-field communication (NFC), Wi-Fi, Wi-Fi direct, Li-Fi, acoustic or ultrasonic audio communication, Ultra-Wideband (UWB), machine-to-machine communication, and/or man-to-machine communication.

Figure 2:
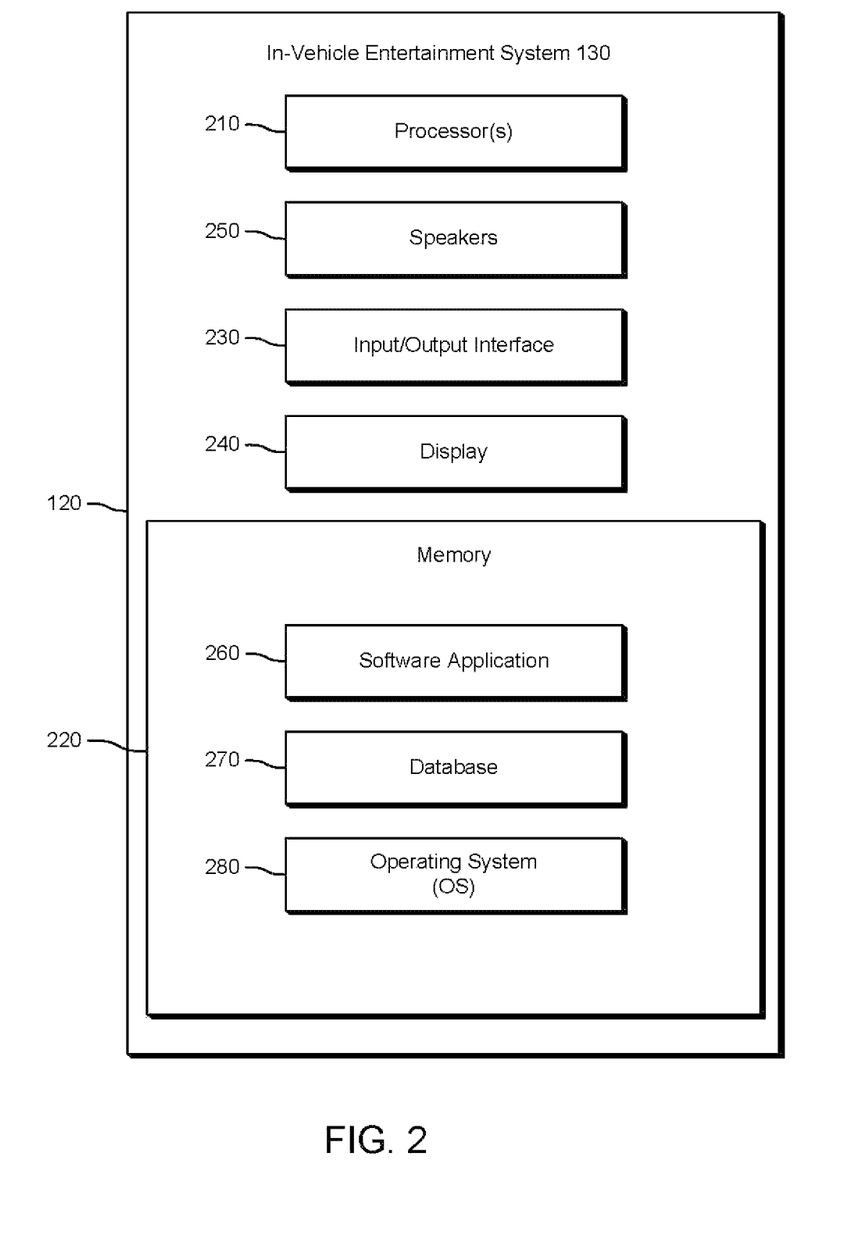
FIG. 2 illustrates some example functional blocks that may be included in an in-vehicle entertainment system in accordance with an embodiment of the disclosure.

FIG. 2 illustrates some example functional blocks that may be included with in-vehicle entertainment system 130 and/or vehicle computer 110 in accordance with one or more embodiments of the disclosure. As one of skill in the art will appreciate, system requirements may include sharing of components as needed. For example, computer 110 and in-vehicle entertainment system may be combined or directly coupled within vehicle 100.

The functional blocks of the in-vehicle entertainment system 130 may include a processor 210, memory 220, an input/output (I/O) interface 230, a display 240, speakers 250, software application 260, database 270, and an operating system (OS) 280. The I/O interface 230, may include a touchscreen having softkeys (graphical icons), and a biometric component (to enable facial recognition, a fingerprint scanner, or a microphone for voice command input) and/or a camera to enable interaction. Any human-machine-interface may be used herein. The HMI may include video screen or the like. The operating system 280 can be any of various kinds of software used for operating the in-vehicle entertainment system 130 such as, for example, an iOS® operating system, an Android® operating system, or a Windows® operating system.

Software application 260 may be a software application provided as part of vehicle 100 or be a downloaded application. In one or more embodiments, software application 260 operates to carry out various actions for determining a duration of an advertisement displayed on display 240 or played on speakers 250. For example, in one or more embodiments, software application 260 computes a minimum duration prior to a user being able to "skip" an advertisement.

In-vehicle entertainment system 130, in one or more embodiments, may be coupled to various components in the vehicle 100, such as, for example, a system for in-vehicle communications (displaying messages, providing warnings, etc.) and coupled to sensor nodes 150a, 150b, 150c, 150d and 150e for detecting speed of vehicle and location of vehicle 100. In some instances, the sensors may be wireless. In one or more embodiments, vehicle information from sensor nodes 150a-e is provided to in-vehicle entertainment system 130 to enable one or more embodiments.

The computer 110 in the vehicle 100 may be configured to operate in cooperation with the software application 260 for in-vehicle entertainment system 130 in accordance with one or more embodiments to provide vehicle information and/or user data. The software application 260, in one or more embodiments, may be executed for adjusting the length of advertisements played with in-vehicle entertainment system 130. Advertisements can include media displayed on display 240 or audio played over speakers 250 or include other types of entertainment outputs accessible over I/O interface 130 or the like. For example, computer 110 includes transceiver 120, which can interact with network 140 and receive additional user data and/or vehicle information for use by software application 260.

Referring back to FIG. 2, memory 220, which is one example of a non-transitory computer-readable medium, may be used to store the operating system (OS) 280, database 270, and various modules such as the software application 260. One or more modules in the form of computer-executable instructions may be executed by the processor 210 for performing various operations in accordance with the disclosure. More particularly, software application 260 may be executed by processor 210 to enable one or more methods in accordance with embodiments herein, such as to enhance the vehicle operator and passenger experiences with in-vehicle entertainment system 130. In one or more embodiments, methods and systems supported by software application 260 relate to providing variable duration in-vehicle advertisement by adjusting when a user or passenger can skip such advertisements based on how much a user or passenger interacts with the in-vehicle entertainment system 130. For example, one premise is that if a user has high interaction with the in-vehicle entertainment system, advertisements should be shorter and/or the time elapsed prior to enabling a user to skip advertisements may be shortened to enhance a user experience.

Figure 3:
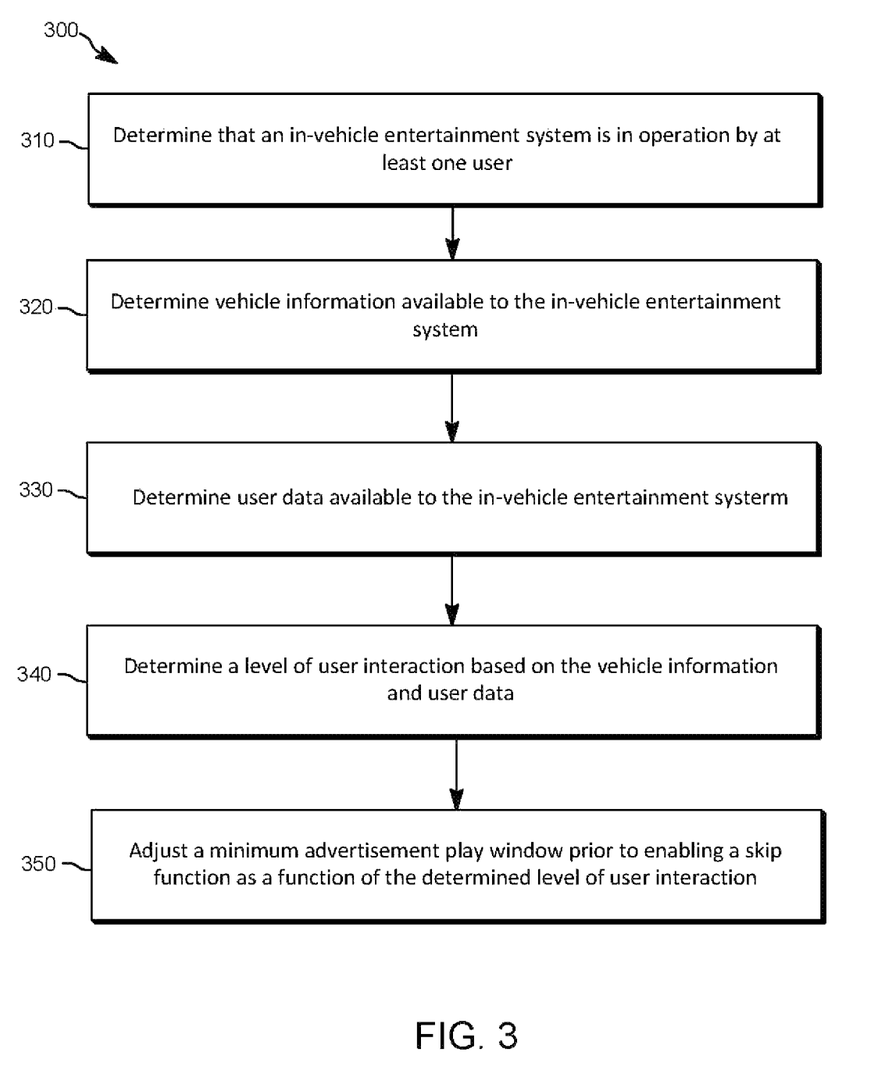
FIG. 3 illustrates a flow diagram of a method in accordance with an embodiment of the disclosure.

Referring to FIG. 3, a flow diagram illustrates a method 300 for an in-vehicle entertainment system in accordance with an embodiment of the disclosure. As shown, block 310 provides for determining that an in-vehicle entertainment system is in operation by at least one user. For example, referring to FIG. 1, vehicle 100 includes an in-vehicle entertainment system accessible by a vehicle operator and/or a passenger. Block 320 provides for determining vehicle information available to the in-vehicle entertainment system. For example, vehicle information available to in-vehicle entertainment system 130 can include any vehicle information available while media is being played. In one or more embodiments, such vehicle information includes a current vehicle speed or drive mode. For example, a driver may be operating in self-driving mode, sport mode, or operating with cruise control activated. In one or more embodiments, vehicle information may include a vehicle location, such as whether the vehicle is moving on a freeway, local streets, near a school or the like. In other embodiments, vehicle information may include whether a driver is following a known route, whether the vehicle is close to a destination and whether a high or low amount of traffic is present.

In one embodiment, determining vehicle information may include receiving data identifying a speed of the vehicle and/or receiving data identifying a distance to a user destination. In one embodiment, determining vehicle information may further include identifying whether the vehicle is traveling on a freeway, located in a high traffic area, traveling near a school, or traveling through local streets. In one embodiment, the determining the vehicle information includes receiving information collected by one or more of ultrasonic, radar, LiDar, Bluetooth®, satellite, WiFi or cloud-based network data. In one embodiment, determining vehicle information includes receiving the vehicle information from a cellular device connected to the in-vehicle entertainment system.

Block 330 provides for determining user data available to the in-vehicle entertainment system. User data available to the in-vehicle entertainment system may include any user data available while the in-vehicle entertainment system is in operation. For example, user data may include user preferences, the type of media being played via in-vehicle entertainment system, whether the user is a vehicle driver or a passenger, inputs from a user, data related to any premiums paid by the user and the like. In one embodiment, determining user data includes receiving data related to whether a passenger is present in vehicle 100. For example, many vehicles include an air bag detection switch that detects the weight of objects on a seat to determine the presence of a passenger. Such a switch can be coupled to in-vehicle entertainment system to provide user data about the presence of a passenger.

In one embodiment, determining user data includes receiving historical user data, the historical user data identifying past interactions and one or more user preferences associated with the in-vehicle entertainment system. For example, a vehicle driver may have pre-existing user preferences stored in in-vehicle entertainment system or receive current user preferences.

Block 340 provides for determining a level of user interaction based on the vehicle information and the user data. For example, in one embodiment, the user data and vehicle information may be weighted and determined to be inversely proportional or directly proportional to an advertisement play window prior to permitting a skip to user-chosen content. Determining a level of user interaction, in some embodiments, can include determining whether different driving conditions increase or decrease user interaction with in-vehicle entertainment system 130. Thus, different variables may be proportional to user interaction or be inversely proportional to user interaction.

Block 350 provides for adjusting a minimum advertisement play window prior to permitting a skip to user-chosen content as a function of a level of user interaction. According to one embodiment, when a user or passenger is interacting with an in-vehicle entertainment system, a high level of user interaction is determined, and the method calculates fewer advertisements and/or a shorter duration prior to enabling a skip function. For example, in one or more embodiments, adjusting the minimum advertisement duration includes determining how long an advertisement, either audio or video or otherwise will play before a user can successfully end the advertisement by communicating a "skip" to the in-vehicle entertainment system 130. In one embodiment, the adjusting a minimum advertisement play window prior to permitting a skip to user-chosen content as a function of the level of user interaction includes reducing the minimum advertisement play window if the level of user interaction is high and increasing the minimum advertisement play window of the level of user interaction is low.

In one embodiment, for example, user inputs and feedback and historical user information, such as metadata and the like may operate as inputs for determining an average and standard deviation of time based on different context combinations to determine when a user can be allowed to skip an advertisement.

One such formula can include:

$$\mu_{delta\_skip,i,j,k}(t+1)=\alpha*\mu_{delta\_skip,i,j,k}(t)+(1-\alpha)*T_{delta\_skip}$$

for the mean calculation, and $$\sigma^2_{delta\_skip,i,j,k}(t+1)=\alpha*(\sigma^2_{delta\_skip,i,j,k}(t))+(1-\alpha)*(T_{delta\_skip}-\mu_{delta\_skip,i,j,k}(t))^2$$

for a variance update calculation.

Based on context combinations, in one embodiment, determining a level of user interaction based on vehicle information and user data can include learning the mean and standard deviation of time after skip button appears to a user by applying as a mean update, the formula:

$$\mu_{delta\_skip,i,j,k}(t+1) = \alpha * \mu_{delta\_skip,i,j,k}(t) + (1-\alpha) * T_{delta\_skip}, \text{ and}$$

$$\sigma^2_{delta\_skip,i,j,k}(t+1) = \alpha * (\sigma^2_{delta\_skip,i,j,k}(t)) + (1-\alpha) * (T_{delta\_skip} - \mu_{delta\_skip,i,j,k}(t))^2,$$

as a variance update. In the formulas, i, j and k are the encoding indices representing the user data and vehicle information such as vehicle speed range, presence of a passenger, route data, time of day and the like.

In one embodiment, a pessimistic estimate of advertisement play time may include the formula: $\mu - z*\sigma$. An optimistic estimate of advertisement play time may include the formula $\mu + z*\sigma$ wherein longer advertisement play time can be altered with minimums and maximum variables in accordance with system requirements.

Figure 4:
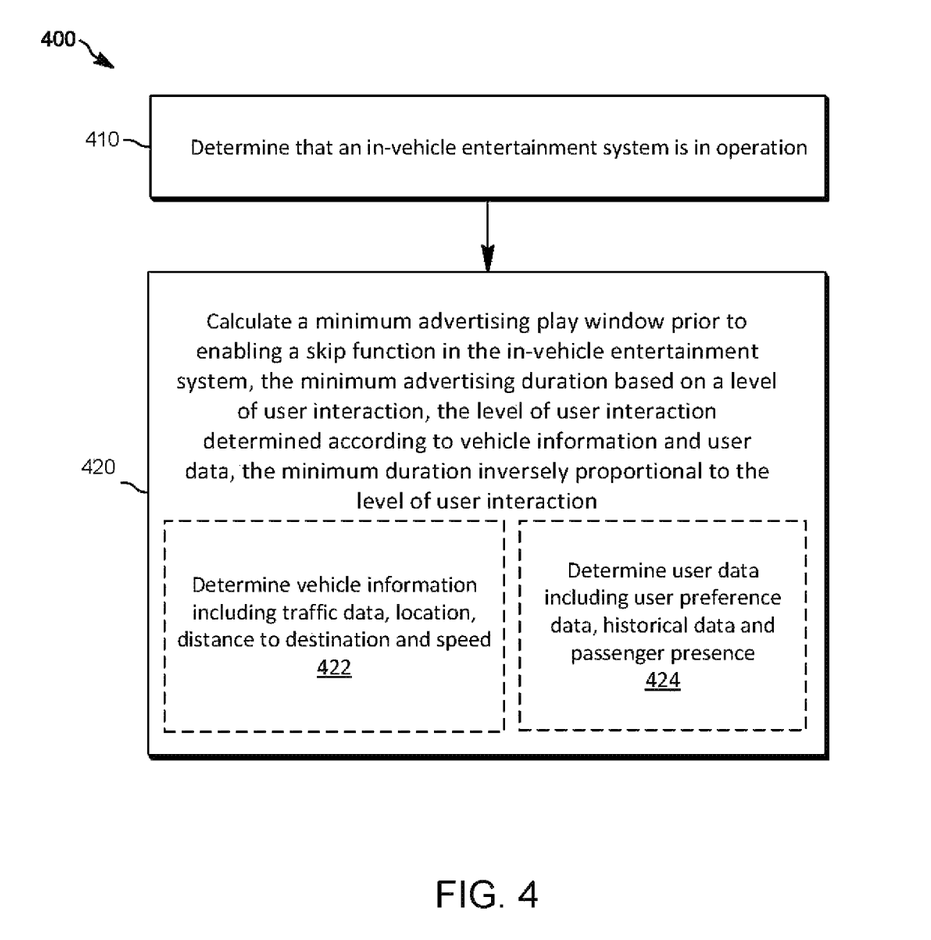
FIG. 4 illustrates a flow diagram of a method in accordance with an embodiment of the disclosure.

Referring to FIG. 4, one embodiment of a method 400 for a vehicle is shown. Block 410 provides for determining that an in-vehicle entertainment is operational. For example, vehicle 100 may include an in-vehicle entertainment system that operates whether vehicle 100 is operating or not.

Block 420 provides for calculating a minimum advertisement play window prior to permitting a skip to user-chosen content in the in-vehicle entertainment system, the minimum advertising play window prior to permitting the skip to user-chosen content based on a level of user interaction, the level of user interaction determined according to received vehicle data and user information, the minimum advertisement play window inversely proportional to the level of user interaction. For example, in one or more embodiments, calculating a minimum advertising play window prior to permitting a skip to user-chosen content may include calculating different criteria that affect a level of user interaction to enhance a user experience by making the minimum advertising play window prior to permitting the skip to user-chosen content variable as conditions change. According to one or more embodiment, when a driver is distracted, a minimum advertising play window prior to permitting a skip to user-chosen content can be longer.

Block 422 provides for determining vehicle information including traffic data, location, distance to destination and speed. For example, in some embodiments, vehicle information can include GPS data, and data received by computer 110 received through transceiver 120.

Block 424 provides for determining user data including user preference data, historical data and passenger presence. For example, in some embodiments, user data can include stored preferences, new preferences, and a determination of whether a driver or a passenger is using the in-vehicle entertainment system. In one embodiment, the received vehicle data includes a current vehicle speed, such as determined by a vehicle speedometer. Received vehicle information can further include a driver mode. For example, some vehicles may provide that a driver can choose a drive mode, either sport mode, leisure mode, or the like. Received vehicle information may further include information received from sensors or over a network including a location of vehicle 100, a determination that vehicle 100 is on a predetermined route, traffic conditions, and a distance to a destination.

In one or more embodiments, the minimum advertising duration, or the minimum play window prior to permitting a skip to user-chosen content is directly proportional to a current vehicle speed and/or the distance to a destination. For example, when a vehicle is moving fast, the minimum play window prior to permitting a skip to user-chosen content may be longer since the driver is not interacting with the in-vehicle entertainment system. Likewise, if a vehicle is close to a destination, a minimum play window prior to permitting a skip to user-chosen content may be longer because a driver will not be interacting with the in-vehicle entertainment system because the driver does not want to miss a turn or miss an exit close to a destination.

In one or more embodiments, the minimum advertising play window prior to permitting a skip to user-chosen content can be inversely proportion to a traffic condition. For example, if there is high traffic, the advertising play window prior to permitting a skip to user-chosen content will be increased because a driver would not be interacting with the in-vehicle entertainment system.

In contrast, in one embodiment, the user data includes determining a minimum advertising play window prior to permitting a skip to user-chosen content as a minimum default play window when a passenger is interacting with the in-vehicle entertainment system. Due to a lack of distractions, when a passenger can be interacting with an in-vehicle entertainment system at any time, variables such as vehicle speed, traffic and such are no longer relevant to a length of advertisement or the length of a play window prior to permitting a skip to user-chosen content and can be taken out of the equation for determining advertisement length or a play window prior to permitting a skip to user-chosen content.

In one embodiment, user data includes historical data stored by the in-vehicle entertainment system such as purchase history, browsing history and stored user preferences. For example, some vehicles can identify different users and have stored metadata that identifies media tastes, and preference for length of advertisements and the like.

Figure 5:
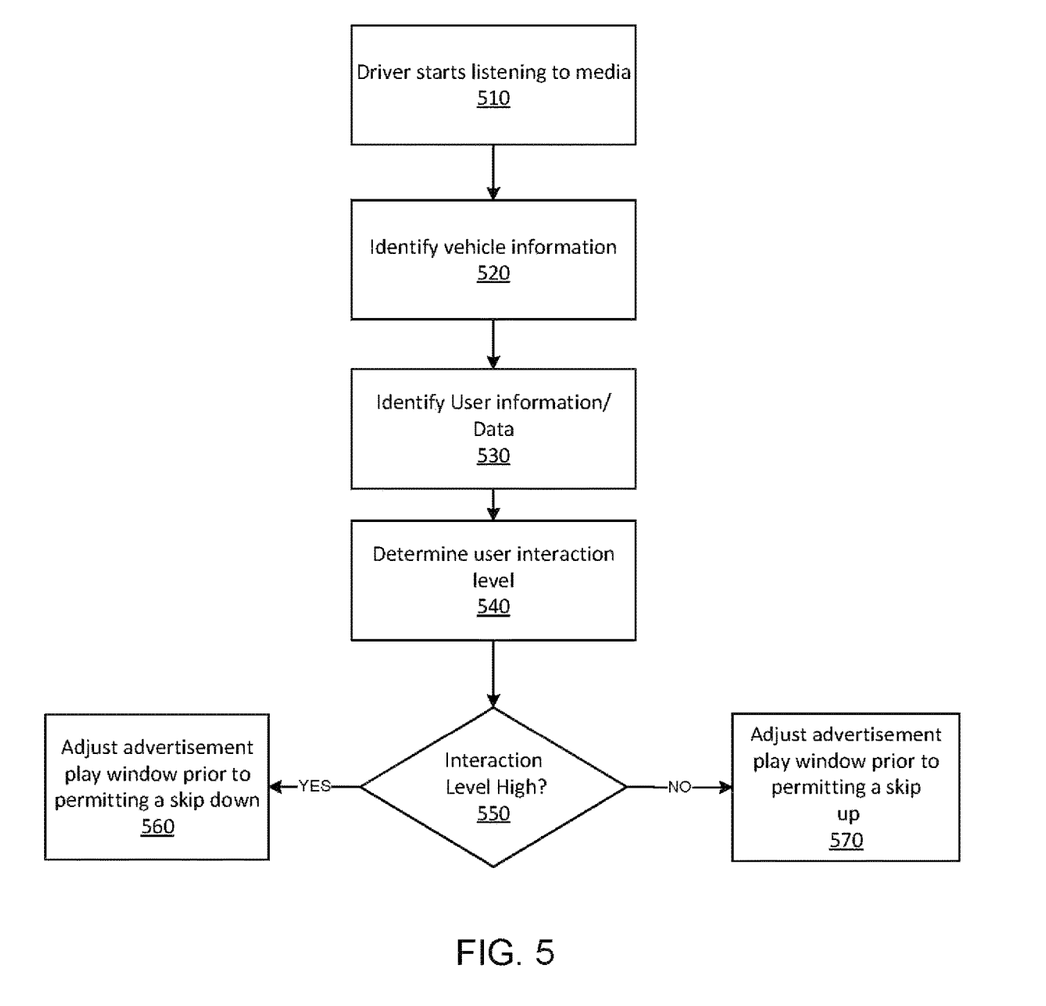
FIG. 5 illustrates a decision process flow diagram in accordance with an embodiment of the disclosure.

Referring now to FIG. 5, a decision flow diagram illustrates one or more embodiments of the disclosure. Block 510 provides for a driver to start listening to media. For example, vehicle 100 may be in operation and in-vehicle entertainment system 130 may be playing audio media. Block 520 provides for identifying vehicle information. For example, the vehicle information described above can be received by in-vehicle entertainment system 130, including the information received by vehicle computer 110, and sensors 150a-e, or network 140. Block 530 provides for identifying user information/user data such as stored user preference data, received user data, and input user data.

Block 540 provides for determining a user interaction level based on the received and identified user data and vehicle information. Decision block 550 asks whether the interaction level is high. If there is a high interaction, the advertisement play window prior to permitting a skip to user-chosen content can be lower as shown in block 560. If there is low interaction with the in-vehicle entertainment system, the advertisement play window prior to permitting a skip to user-chosen content may be adjusted upward.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, nomadic devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are That which is claimed is:

1. A method for a vehicle comprising:
   determining that an in-vehicle entertainment system is in operation; and
   calculating a minimum advertising play window prior to enabling a skip function in the in-vehicle entertainment system, wherein the minimum advertising play window prior to permitting a skip to user-chosen content is based on a level of user interaction, wherein the level of user interaction is determined according to vehicle information and user information, wherein the vehicle information includes at least a traffic characteristic, one or more of a current vehicle speed, a driver mode, a location of the vehicle, a predetermined route, a traffic condition, and a distance to destination, wherein the user information includes historical user interaction data, wherein the minimum advertising play window prior to permitting the skip to user-chosen content is inversely proportional to the level of user interaction, and wherein the minimum advertising play window prior to permitting the skip to user-chosen content is directly proportional to the current vehicle speed and the distance to destination.

2. The method of claim 1 wherein the minimum advertising play window prior to permitting the skip to user-chosen content is inversely proportional to the traffic condition.

3. The method of claim 1 wherein the user information includes determining the minimum advertising play window prior to permitting the skip to user-chosen content as a minimum default play window when a passenger is interacting with the in-vehicle entertainment system.

4. The method of claim 1 wherein the user information is based on historical data including one or more of a purchase history, a browsing history, and a stored user preference.

5. An in-vehicle entertainment system for a vehicle comprising:
   a memory that stores computer-executable instructions; and
   a processor configured to access the memory and execute the computer-executable instructions to:
      determine that the in-vehicle entertainment system is in operation by a user;
      determine vehicle information comprising one or more of a current vehicle speed, a driver mode, a location of the vehicle, a predetermined route, a traffic condition, and a distance to destination;
      determine user data;
      determine a level of user interaction based on the vehicle information and the user data;
      calculate a minimum advertising play window prior to permitting a skip to user-chosen content prior to enabling a skip function based on the level of user interaction, wherein the vehicle information includes at least a traffic characteristic and the user data includes historical user interaction data, the minimum advertising play window prior to permitting the skip to user-chosen content being inversely proportional to the level of user interaction;
      determine the minimum advertising play window prior to permitting the skip to user-chosen content as directly proportional to the current vehicle speed; and
      determine the minimum advertising play window prior to permitting the skip to user-chosen content as inversely proportional to the traffic condition.

6. The in-vehicle entertainment system of claim 5, wherein the processor configured to access the memory and execute the computer-executable instructions is further configured to:
   receive sensor data from collected by one or more of ultrasonic, radar, LiDar, Bluetooth, or cloud-based network data.

7. The in-vehicle entertainment system of claim 5, wherein the processor configured to access the memory and execute the computer-executable instructions is further configured to:
   determine the minimum advertising play window prior to permitting the skip to user-chosen content as a minimum default play window when a passenger is interacting with the in-vehicle entertainment system.

8. The in-vehicle entertainment system of claim 5, wherein the processor configured to access the memory and execute the computer-executable instructions is further configured to:
   determine the user data based on historical data including one or more of a purchase history, a browsing history, and a stored user preference.

9. A method for a vehicle comprising:
   determining that an in-vehicle entertainment system is in operation; and
   calculating a minimum advertising play window prior to enabling a skip function in the in-vehicle entertainment system, wherein the minimum advertising play window prior to permitting a skip to user-chosen content is based on a level of user interaction, wherein the level of user interaction is determined according to vehicle information and user information, wherein the vehicle information includes at least a traffic characteristic, one or more of a current vehicle speed, a driver mode, a location of the vehicle, a predetermined route, a traffic condition, and a distance to destination, wherein the user information includes historical user interaction data, wherein the minimum advertising play window prior to permitting the skip to user-chosen content is inversely proportional to the level of user interaction, and wherein the minimum advertising play window prior to permitting the skip to user-chosen content is inversely proportional to the traffic condition.

* * * * *